Aug. 6, 1935.  A. T. DAWZDA  2,010,750
SWIMMING DEVICE
Filed Nov. 20, 1933  3 Sheets-Sheet 1
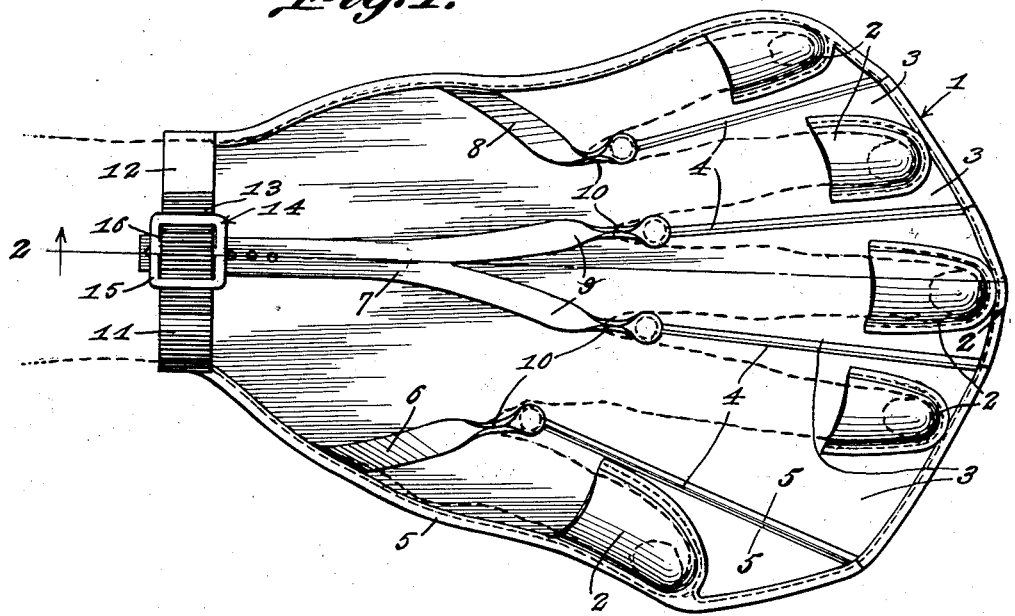
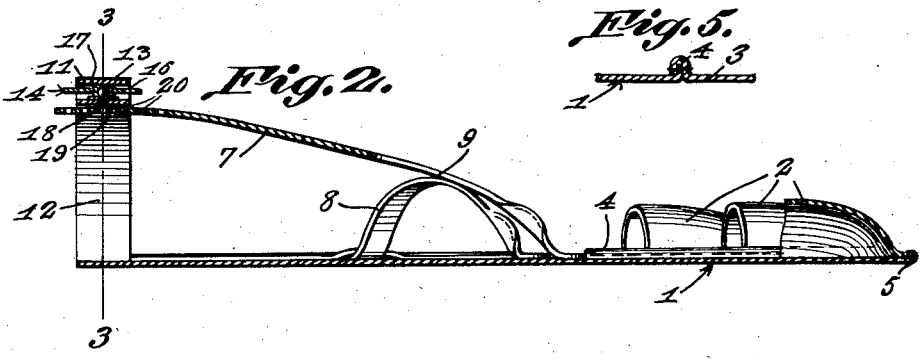
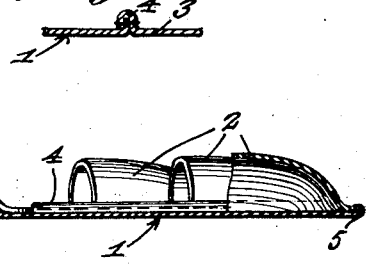
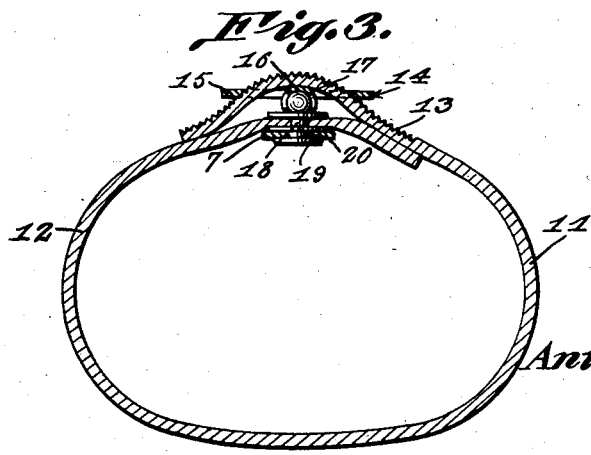
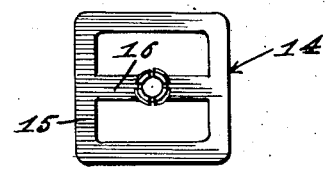
Anton T. Dawzda, INVENTOR
BY Victor J. Evans & Co. ATTORNEY

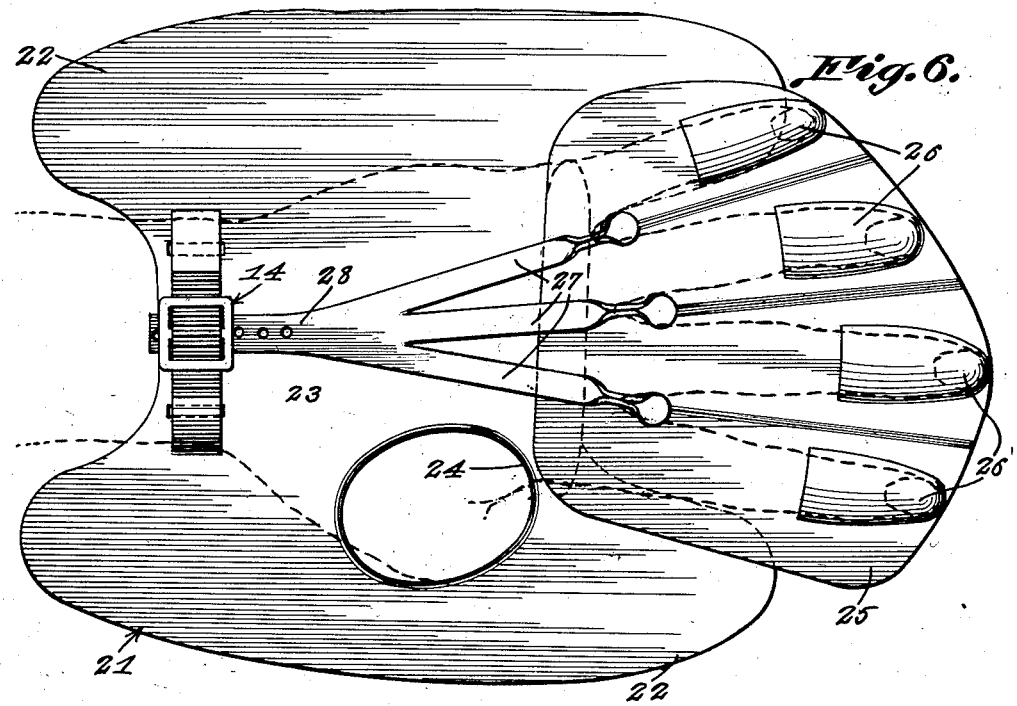
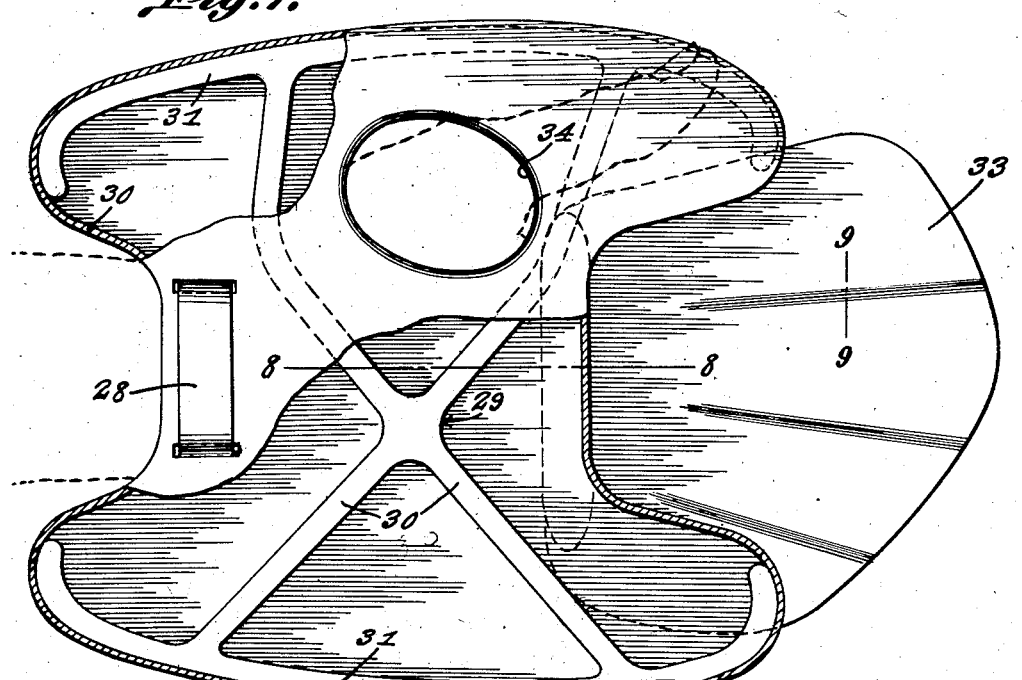

Aug. 6, 1935.  A. T. DAWZDA  2,010,750
SWIMMING DEVICE
Filed Nov. 20, 1933   3 Sheets-Sheet 3
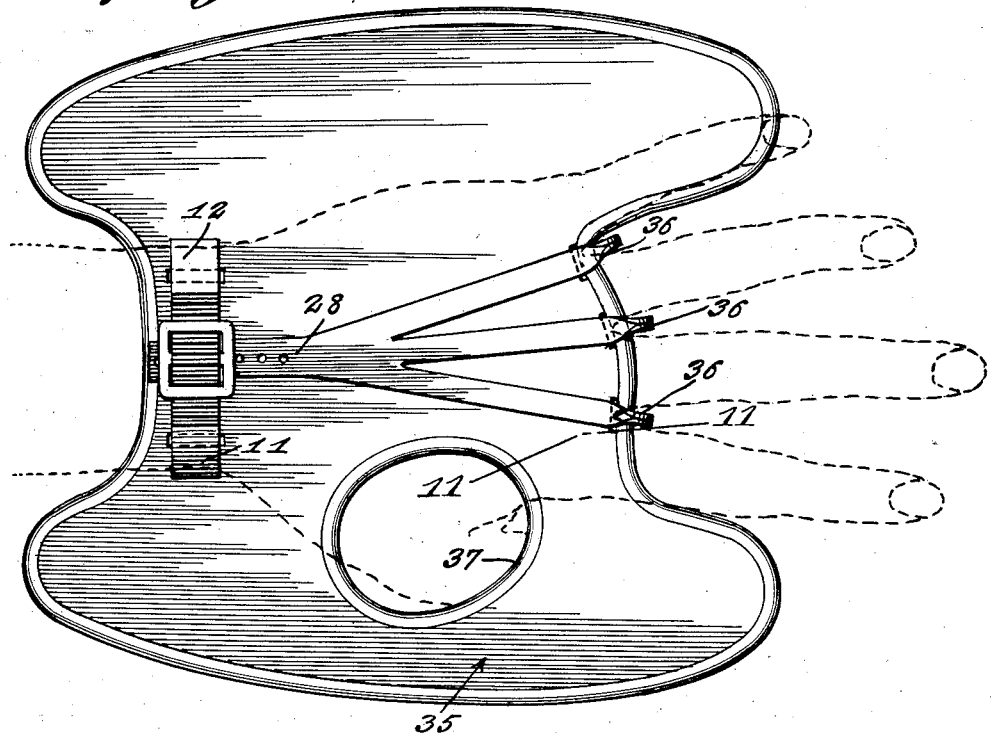
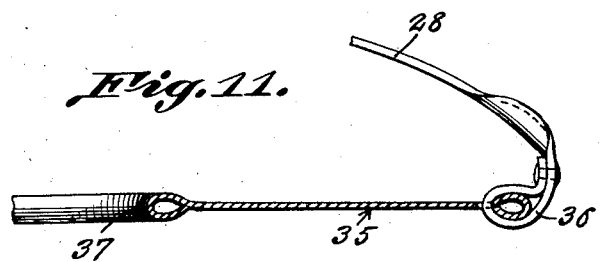
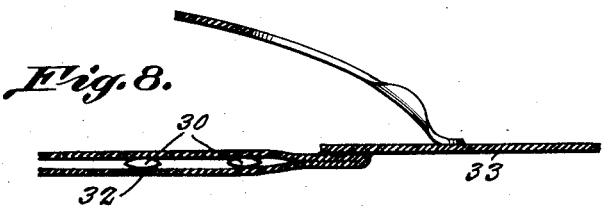
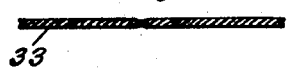
Anton T. Dawzda, INVENTOR
BY Victor J. Evans & Co. ATTORNEY Patented Aug. 6, 1935

2,010,750

UNITED STATES PATENT OFFICE 2,010,750

SWIMMING DEVICE

Anton T. Dawzda, Hamilton, Ontario, Canada

Application November 20, 1933, Serial No. 698,907

5 Claims. (Cl. 9—21)

This invention relates to swimming appliances especially adapted to be worn on the hands of a swimmer and has for the primary object the provision of means for aiding a person in swimming by increasing the efficiency of the propelling strokes of the hands, thus giving the person greater endurance and speed in the water and also providing an aid to persons learning the art of swimming.

With these and other objects in view this invention consists in certain novel features of construction, combination and arrangement of parts to be hereinafter more fully described and claimed.

For a complete understanding of my invention, reference is to be had to the following description and accompanying drawings, in which Figure 1 is a plan view illustrating a swimming device constructed in accordance with my invention and showing the same applied to a hand.

Figure 2 is a sectional view taken on the line 2—2 of Figure 1.

Figure 3 is a sectional view taken on the line 3—3 of Figure 2.

Figure 4 is a plan view illustrating a fastening device.

Figure 5 is a sectional view taken on the line 5—5 of Figure 1.

Figure 6 is a plan view illustrating a modified form of my invention.

Figure 7 is a bottom plan view partly in section illustrating another modified form of invention.

Figure 8 is a detail sectional view taken on the line 8—8 of Figure 7.

Figure 9 is a detail sectional view taken on the line 9—9 of Figure 7.

Figure 10 is a plan view illustrating another modified form of my invention.

Figure 11 is a detail sectional view taken on the line 11—11 of Figure 10.

Referring in detail to the drawings, the numeral 1 indicates a sheet of any suitable material which will be durable and water proof and in general outline is of substantially paddle shape and gradually tapers in width from one end towards its opposite end so that the smallest end will be of a width substantially the width of a person's wrist while the larger end is of a width to accommodate the fingers and thumb of the person's hand when said fingers and thumb are spread apart. Secured to one face of the sheet 1 are finger and thumb stalls 2 to receive the ends of the fingers and the thumb of the person's hand so that the sheet will be supported to cover the palm of the hand as well as the fingers and thumb. The sheet forms between the fingers and thumb webs 3 each provided with a fold or crease 4 extending from one end of the sheet towards the opposite end and terminating at the juncture of the fingers and thumb with the hand. The sheet at its side edges and one end is preferably bound, as shown at 5, to reinforce the sheet.

The sheet is provided with straps 6, 7 and 8 for the purpose of aiding in retaining the sheet in an operative position upon the hand. The straps 6 and 8 at one end are secured to opposite side edges of the sheet and the other ends of said straps 6 and 8 are secured to a pair of webs 3, the strap 8 being secured to the web 3 lying between the little finger and the ring finger, while the strap 6 is secured to the web lying between the thumb and the index finger.

The strap 7 is provided with diverging portions 9 secured to another pair of webs 3, one web lying between the ring finger and the middle finger and the other web lying between the middle finger and the index finger. The straps where they pass between the fingers and the thumb are preferably reduced in width, as shown at 10, and their ends which are secured to the webs are substantially circular shaped.

The wrist portion of the sheet is provided with straps 11 and 12 cooperating with each other to extend about the wrist of the person and the strap 11 is provided with serrations 13 and its serrated portion has mounted thereon a fastener 14 consisting of a rectangular shaped frame 15 having a cross bar 16 carrying a female portion 17 of a separable fastener. The strap 11 is fed through the frame and over the bar 16, as shown in Figure 3, with the end portions of the frame engaging the serrations preventing the frame from slipping upon the strap 11. The strap 12 has secured thereto the male part 18 of the separable fastener, one end of which is in the form of a ball to fit within the female section 17, while the opposite end is in the form of a button or disc 19 adapted to be passed through any one of a series of openings 20 in the straps 7 thereby adjustably securing the straps 11 and 12 about the wrist and also adjustably securing the strap 7 to the straps 11 and 12. The device thus applied to the hand will be held against accidental displacement from the hand and is capable of adjustment so that it may be applied to hands of different sizes, the adjustment being easily accomplished by the fastener 14. The device when applied to the hand, as shown in Figure 1, will readily follow the movement of the hand and also the fingers and thumb of the hand so that when the hand is on a power stroke the web portions will prevent passage of water between the fingers and the thumb and consequently materially aid the hand upon its propelling stroke allowing the swimmer to cover a greater distance with less effort and with greater speed. During the non-power stroke of the hand the fingers and thumb may be moved towards each other and also towards the palm of the hand, the sheet or the web portions thereof readily collapsing to further said movements consequently permitting the hand to be moved out of the water or through the latter with minimum resistance to the water.

Referring to my modified form of invention, as shown in Figure 6, the appliance consists of a rigid plate-like member 21 constructed of any suitable alloy and cutaway at opposite ends to form blade portions 22 connected by a medial portion 23 to underlie or engage the palm of the hand. The member 21 between one of the blades and the medial portion is provided with a thumb opening 24 so that when the thumb is positioned in the opening, the blades will be arranged at opposite sides of the hand with the fingers extending beyond one of the cutaway ends of the member 21 and the latter adjacent its opposite end is equipped with slots to permit the straps 11 and 12 to be connected thereto. A sheet 25 having finger stalls 26 is secured at one edge to one end of the medial portion 23 of the member 21 and is similarly constructed to the form of invention described in Figure 1, that is the sheet provides between the fingers web portions to which are connected the diverging ends 27 of a strap 28. The strap 28 is connected to the fastener 14. The form of invention shown in Figure 6 provides an appliance in which one part is of a rigid construction while the other part is of a flexible construction and the flexible part is adapted to follow the movement of the fingers of the hand while the rigid portion engages with the palm of the hand and projects a considerable distance beyond the opposite sides thereof so that during the power stroke of the hand the appliance will cover a large area of water and thereby permit the swimmer to obtain maximum traction in the water.

Referring to my form of invention as shown in Figures 7 to 9 inclusive, the appliance consists of a skeleton frame 29 including interconnected cross bars 30 carrying side members 31, the ends of which curve inwardly. The frame is covered with a sheet 32 of suitable material and said sheet is provided with oppositely arranged cutaway portions, one of said portions to lie adjacent the wrist while the other cutaway portion is to underlie the fingers of the hand and has secured thereto a sheet 33 constructed similalry to the sheet 25. The sheet 32 is provided with a thumb opening 34. In this form of invention the strap 28 is employed as well as the straps 11 and 12 with their respective fastener 14.

Referring to my modified form of invention, as shown in Figures 10 and 11 it consists of a rigid plate 35 constructed similarly to the member or plate 21 and has the straps 11 and 12 connected thereto and also employs a strap 28, the diverging ends thereof extending between the fingers and connected to one edge of the plate, as shown at 36. The plate 35 is provided with a thumb opening 37. The edges of the plate 35 and the edges of the opening 37 are preferably rounded, as shown in Figures 10 and 11.

In the forms of my invention having the thumb opening may be equipped with a suitable padding about the walls of the thumb opening so as to protect the thumb of the user.

Having described the invention, I claim:

1. A swimming appliance comprising a sheet of material of substantially paddle shape to engage the palm of the hand and fingers and thumb of said hand and provide between the fingers and thumb web portions, finger and thumb stalls secured to the web portions to receive the ends of the fingers and thumb of the hand, straps secured to the web portions and extending between the fingers and thumb, some of said straps secured to opposite edges of the sheet and the other strap provided with a series of openings, an adjustable wrist encircling strap carried by the sheet, and means carried by the wrist encircling strap to adjustably connect the ends thereof and to connect said strap having the series of openings thereto.

2. A swimming appliance comprising a panel-like member provided with a thumb opening and including blade-like portions connected by a medial portion to engage the palm of the hand with the fingers projecting beyond one end of the panel-like member, a sheet secured to the panel-like member and having finger stalls to receive the fingers and providing between the fingers web portions, and means connected to the member and to the web portions for connecting the panel-like member to the hand.

3. A swimming appliance comprising a rigid plate-like member having oppositely arranged cut-away portions and a thumb opening, a strap having diverging portions connected to one edge of the plate and extending between the fingers of a hand, and a wrist encircling strap adjustably connected to the first-named strap.

4. A swimming appliance comprising a skeleton frame including side members and cross members of integral construction, a cover mounted to the frame for closing the latter and provided with a thumb opening to permit the passing of a thumb of a person's hand through the cover with the palm of the hand resting against one face of said cover and with the fingers projecting beyond one end of said cover, and a plate secured to the cover and underlying the fingers to provide therefor a web.

5. A swimming device comprising a panel having opposite ends cut away to define side portions of greater length than a medial portion, means for securing a person's hand to the panel with the palm of the hand resting on the medial portion and the fingers projecting beyond one end thereof, said panel having an opening lying in the medial portion and one of the side portions to permit the person's thumb to extend through said panel.

ANTON T. DAWZDA.